United States Patent
Mishra et al.

(10) Patent No.: US 10,924,397 B2
(45) Date of Patent: Feb. 16, 2021

(54) MULTI-VRF AND MULTI-SERVICE INSERTION ON EDGE GATEWAY VIRTUAL MACHINES

(71) Applicant: VMware, Inc., Palo Alto, CA (US)

(72) Inventors: Rahul Mishra, Mountain View, CA (US); Kantesh Mundaragi, Sunnyvale, CA (US); Stephen Tan, San Jose, CA (US); Akhila Naveen, Campbell, CA (US); Pierluigi Rolando, Santa Clara, CA (US); Raju Koganty, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/283,665

(22) Filed: Feb. 22, 2019

(65) Prior Publication Data
US 2020/0274799 A1    Aug. 27, 2020

(51) Int. Cl.
*H04L 12/28* (2006.01)
*H04L 12/713* (2013.01)
*H04L 12/707* (2013.01)
*H04L 29/12* (2006.01)

(52) U.S. Cl.
CPC ............ *H04L 45/586* (2013.01); *H04L 45/22* (2013.01); *H04L 61/6022* (2013.01)

(58) Field of Classification Search
CPC ..... H04L 12/4675; H04L 45/02; H04L 45/00; H04L 45/586; H04L 41/50; H04L 45/28; H04L 45/60; H04L 43/0817; H04L 45/22; H04L 5/0035; H04L 5/0055; H04L 5/0057; H04L 12/2869; H04L 12/5695; H04L 47/00; H04L 47/70; H04L 47/78; H04L 47/821; H04L 47/827; G06F 11/2025; G06F 11/2046; G06F 11/2038; G06F 11/006; H04W 72/04

See application file for complete search history.

(56) References Cited

U.S. PATENT DOCUMENTS

| | | | |
|---|---|---|---|
| 9,647,883 B2 | 5/2017 | Neginhal et al. | |
| 9,787,559 B1* | 10/2017 | Schroeder | ........... H04L 41/5038 |
| 10,097,403 B2* | 10/2018 | Anand | ................ H04L 12/4641 |
| 2008/0198849 A1* | 8/2008 | Guichard | ............ H04L 12/4675 370/392 |
| 2011/0055622 A1* | 3/2011 | Arai | ........................ H04L 45/00 714/4.2 |
| 2015/0200848 A1* | 7/2015 | Janakiraman | ....... H04L 12/4633 370/392 |

\* cited by examiner

Primary Examiner — Jung Liu

(57) ABSTRACT

In an embodiment, a method for a VRF and multi-service insertion on edge gateways is described. In an embodiment, the method comprises: detecting a packet; determining attributes for the packet; based on the attributes, determining whether the attributes match one or more rule attributes of a particular rule in a rule table; in response to determining that the attributes match the one or more rule attributes of a particular rule in the rule table: determining, based on the particular rule, a particular redirection identifier, a particular VRF identifier, a particular next_hop, a particular address pair, and a particular BFD status; based on the particular BFD status, determining whether to redirect the packet; and in response to determining to redirect the packet, redirecting the packet toward a service virtual machine from an interface indicated by one of addresses in the particular address pair.

20 Claims, 15 Drawing Sheets

| 402 Source Addr | 404 Destination Addr | 406 Source Port | 408 Destination Port | 410 Action |
|---|---|---|---|---|
| MySource | MyDestination | MySPort | MyDPort | Redirect UUID |
| ... | | | | |

| 502 Key | 504 Result | 505 ... | 506 Interfaces | 508 BFD Status | 510 Failure Config |
|---|---|---|---|---|---|
| 520 UUIDA | Next_hopA | ... | IP1, IP2 | Hyperlink1 | Hyperlink2 |
| 521 UUIDB ... | Next_hopB | ... | IP3, IP4 | Hyperlink3 | Hyperlink4 |

1300
Datapath Global Policy Configuration Table

| 1302 Key | 1304 Result | 1305 VRF | 1306 Interfaces | 1308 BFD Status | 1310 Failure Config |
|---|---|---|---|---|---|
| UUIDA | Next_hopA | VRF1 | IP1, IP2 | Hyperlink1 | Hyperlink2 |
| UUIDB | Next_hopC | VRF2 | IP1, IP2 | Hyperlink3 | Hyperlink4 |
| ... | | | | | |

1320 → (row 1)
1321 → (row 2)

FIG. 13

| 1402 SessionID | 1404 VRF | 1405 SourceIP | 1406 DestIP | 1408 Status |
|---|---|---|---|---|
| S1<br>S2 | 1<br>1 | IP1<br>IP2 | IP2<br>IP1 | UP<br>UP |
| S1<br>S2 | 2<br>2 | IP1<br>IP2 | IP2<br>IP1 | UP<br>UP |
| ... | | | | |

1400

1420 → S1 row
1422 → S2 row

MULTI-VRF AND MULTI-SERVICE INSERTION ON EDGE GATEWAY VIRTUAL MACHINES

BACKGROUND

In software defined networking, packets may be serviced by service virtual machines. The packets may be provided to the service machines by edge gateways. An edge gateway is a router configured to direct traffic to and from entities implemented in a network. The edge gateway may, for example, provide an entry point into a datacenter and to the service machines. The edge gateway may be executed on a virtual machine that is separate from the service virtual machines and may be implemented as a process that provides connectivity between external networks and the datacenter.

Virtual machines are an example of virtualized computing instances or workloads, which can also include namespace containers, such as Docker containers, or other compute node instances. Service virtual machines may be configured to provide services such as firewall services, load balancing, network address translation, and traffic forwarding. Examples of service insertion mechanism are described, for example, in U.S. patent application Ser. No. 16/120,283 filed Sep. 2, 2018 and entitled "Service Insertion at Logical Network Gateway."

Packets that require servicing may be directed to service virtual machines by edge gateways. If a service machine determines that a packet is allowed, then the service machine redirects the packet back to the edge gateway, and the gateway routes the packet toward a destination of the packet. Packets may be redirected by performing destination network address translation ("DNAT") or by encapsulation, and then forwarding the packets out the appropriate port, according to the new destination address.

When an edge gateway is configured to redirect packets to only one service, the service may be inserted between a Layer 3 ("L3") interface of the gateway and a L3 interface of the service machine, and the gateway and the service machine may be connected via a communications link having a hard-coded Internet Protocol ("IP") address.

When multiple services need to be inserted into an edge gateway, the configuration may become more challenging. The issue may become even more complicated when multiple services need to be inserted on the interfaces that are identified by the same IP address pairs, but that belong to different gateways in a datacenter. Redirecting packets from the different gateways to different service machines when the same IP address pairs are used is particularly difficult to implement.

SUMMARY

In an embodiment, techniques are described for multi-virtual-routing-and-forwarding and multi-service insertion on edge gateways. The techniques may be implemented in a service insertion component of a gateway, or any other component of the gateway that is configured to manage the packet processing, redirecting and routing. The service insertion component may be implemented as a software module, a hardware component, or both.

Virtual routing and forwarding ("VRF") is a technology that may be implemented in IP-based network routers. VRF allows multiple instances of a routing table to coexist in a router and to work simultaneously. The multiple instances of the routing table are usually indexed using VRF identifiers.

The VRF technology increases the routing functionality in the network by allowing network paths to be segmented based on the VRF identifiers, and without a need for implementing multiple routing devices. Because the VRF allows segregating traffic automatically, the VRF provides many benefits such as increased network security without a need for encryption and authentication.

Typically, VRF acts like a logical router, but while a logical router may include many routing tables, a VRF instance uses only a single routing table. An example of a multi-level logical router architecture is described, for example, in U.S. Pat. No. 9,647,883, incorporated herein by reference. The VRF requires a forwarding table that designates a next hop for each data packet. The VRF also requires a list of devices that may be called upon to forward the packet, and a set of rules and routing protocols that govern forwarding of the packets. The rules allow the forwarding of the packets along the VRF paths and prevent the forwarding of the packets outside the paths.

In an embodiment, an approach for redirecting packets from gateways to service virtual machines and back to the gateways supports the packet redirecting even if multiple services are identified using the same IP address pairs of corresponding interfaces. The approach incorporates certain aspects of the VRF technology and is used in virtualization networks to support optimization of packet servicing as well as reduction of the service bandwidth requirements. For example, the approach provides improvements in servicing the packets by speeding up the packet service process and reducing bandwidth requirements for the service processing.

In an embodiment, a method for a multi-VRF and multi-service insertion on edge gateways is described. The method may be implemented in a packet redirector or any other component of a gateway.

In an embodiment, two methods are described. One method includes enabling services insertion and enabling packets redirection from edge gateways to service virtual machines providing the services. Another method includes data flow steps for redirecting packets detected by the edge gateways from the gateways to the service virtual machines providing the corresponding services.

In an embodiment, an enabling method comprises obtaining a rule configuration. The rule configuration may be a file or a data structure that is addressed using an address pointer. The rule configuration may be obtained from a management plane implemented in a datacenter. The rule configuration may include specifications of relationships between rules and services available from service virtual machines deployed in the datacenter. For example, the rule configuration may include information indicating that packets destined to a particular destination need to be inspected by a particular service virtual machine.

Based on, at least in part, the rule configuration, the gateway creates a rule table. The rule table may be implemented as a table data structure, a memory space addressed using pointers, and the like. The rule table may include one or more rule records, and each rule record may comprise one or more packet attributes and a redirection identifier. For example, a rule may state that if a detected packet has a particular IP address of a packet source, then the packet is to be redirected to a particular service machine for servicing.

In an embodiment, the method further comprises obtaining a policy configuration. The policy configuration may be obtained from the management plane and may include information configured by the management plane for the datacenter. The policy configuration may be a file or a data structure that is addressed using an address pointer and may include one or more policy records. Each policy record may include an identifier, a next_hop, and an address pair for interfaces implemented on an edge gateway. The identifier may be implemented as a UUID construct in which the UUID is a universal unique identifier ("UUID") of a data structure storing attributes for the redirecting.

The method further comprises determining a mapping between gateway identifiers and VRF identifiers. The mapping may be determined by issuing a get_VRFs command and collecting responses. The responses may indicate a mapping of VRF identifiers onto gateway identifiers of the edge gateways implemented in the datacenter. The mapping between the VRFs and the edge gateways is 1:1. Then, a get_interfaces command may be issued for each VRF to determine a plurality of interfaces implemented in an edge gateway that belongs to the VRF. The interfaces may be indicated using corresponding UUIDs, described later.

Based on, at least in part, the mapping and the policy configuration, a policy table is generated. The policy table may include one or more table records, and each table record may include a redirection identifier, a next_hop, an address pair for interfaces, and other data. The policy table may be indexed using redirect identifiers, as described later.

Once the rule table and the policy table are generated, packets detected by the edge gateways may be redirected to service virtual machines according to the rules stored in the rule table and according to the policies stored in the policy table.

In an embodiment, a method for redirecting packets from edge gateways to service virtual machines comprises detecting a packet by an edge gateway. Upon detecting the packet, the gateway may determine one or more attributes for the packet. Examples of attributes may include a source IP address, a source MAC address, a destination IP address, a destination MAC address, a source port, a destination port, and so forth.

Based on, at least in part, the attributes, the gateway determines whether the attributes of the packet match one or more rule attributes of any rule in a rule table. If a match is found, then the gateway determines, based on a matching particular rule, a particular redirection identifier, a particular VRF identifier, a particular next_hop, a particular address pair, and a particular BFD status.

Based on, at least in part, the particular BFD status, the gateway determines whether to redirect the packet. For example, if the particular BFD status indicates that the service virtual machine is not reachable for some reason or if the service virtual machine is nonoperative, then the gateway does not redirect the packet to the service virtual machine, and instead, redirects the packet toward a destination of the packet.

However, if the particular BFD status indicates that the service virtual machine is operational and reachable, then the gateway redirects the packet to the service virtual machine for applying a service to the packet. If the service machine allows the packet, then the gateway redirects the packet toward a destination of the packet. However, if the packet is not allowed, then the packet is dropped.

BRIEF DESCRIPTION OF THE DRAWINGS

In the drawings:

FIG. 4 depicts an example rule table.

FIG. 13 is an example datapath global configuration table.

FIG. 14 is an example BFD table.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Datacenters usually support two types of traffic: north-south traffic and east-west traffic. The north-south traffic includes communications between entities implemented in external networks and entities implemented in a datacenter. The entities implemented in the external networks may include clients or cloud-based applications, or "branch offices." The entities implemented in the datacenter may include gateways, user virtual machines, service virtual machines, and the like. In contrast, the east-west traffic includes communications exchanged between, for example, virtual machines implemented within the same datacenter.

1.1. Example Single Service Configurations

Figure 1:
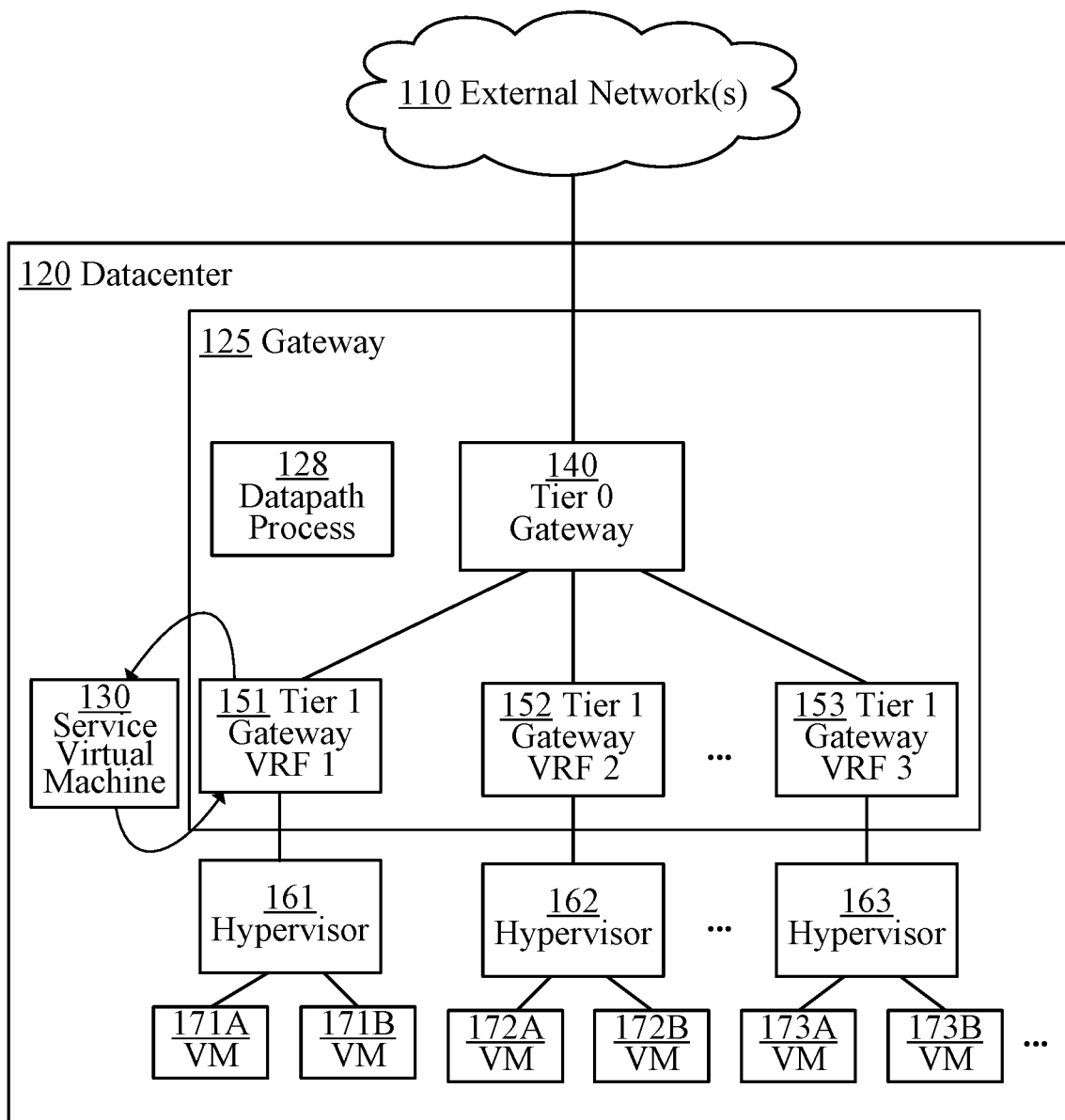
FIG. 1 is a block diagram depicting an example physical implementation view of an example logical network environment for implementing an approach for a multi-VRF and multi-service insertion in edge gateway virtual machines.

FIG. 1 is a block diagram depicting an example physical implementation view of an example logical network environment for implementing an approach for a multi-VRF and multi-service insertion in edge gateway virtual machines. In the depicted example, north-south traffic is communicated from an external network 110 to a datacenter 120, and south-north traffic is communicated from datacenter 120 to external network 110.

Upon receiving traffic from external network 110, datacenter 120 communicates the traffic via, for example, a gateway 125, to hypervisors 161-163, which in turn communicate the traffic to virtual machines 171A-B, 172A-B and 173A-B. A hypervisor is computer software, firmware or hardware that creates and executes virtual machines 171A-B, 172A-B and 173A-B. A virtual machine may be implemented as a virtualized computing instance and may include an addressable data compute node or an isolated user space instance. Hypervisors 161-163 may be configured to receive configuration information from a management plane (not shown in FIG. 1) and provide context information about users/processes to the management plane. Computers on which hypervisors 161-163 execute virtual machines 171A-B, 172A-B and 173A-B are called host computers (not shown in FIG. 1).

In an embodiment, gateway 125 implements one or more Tier 0 gateways and one or more Tier 1 gateways. A Tier 0 gateway is a gateway that provides an on and off gateway service between the logical and physical network. A Tier 1 gateway is a gateway that provides an on and off gateway service between a Tier 0 gateway and hypervisors implemented in host computers. Various configuration implementations of gateway 125 may have any number of Tier 0 gateways and any number of Tier 1 gateways.

In an embodiment, gateway 125 implements one Tier 0 gateway 140 and one or more Tier 1 gateways 151-153. Gateway 125 may be configured to execute processes, such as a datapath process 128, a service insertion process (not shown), a packet redirector (not shown), and the like. Tier 0 gateway 140 and tier 1 gateways may be configured to provide packets to service virtual machines, such as virtual machine 130 that is configured to provide services such as firewall services, load balancing, network address translation, and traffic forwarding.

Gateways 140 and 151-153 may be implemented as one or more processes executing on one or more virtual machines. For example, Tier 0 gateway 140 and multiple Tier 1 gateways 151-153 may be implemented as one process executing on the same virtual machine. In other implementations, gateways 140 and 151-153 are implemented as separate multiple processes and/or separate virtual machines or other type of compute nodes.

Tier 0 gateway 140 may be configured to provide an interface between external network 110 and tier 1 gateways 151-153. Tier 1 gateways 151-153 may be configured to provide an interface between tier 1 gateways 151-153 and service virtual machines, switches and/or routers implemented in the hosts of the datacenter.

In an embodiment, each of gateways 140 and 151-153 has an associated VRF identifier. The mapping between the gateways and the VRF identifiers is 1:1. For example, tier 1 gateway 151 may be associated with a VRF1 identifier, tier 1 gateway 152 may be associated with a VRF2 identifier, and tier 1 gateway 153 may be associated with a VRF3 identifier.

1.2. Example Multi-Service Configuration

Figure 2:
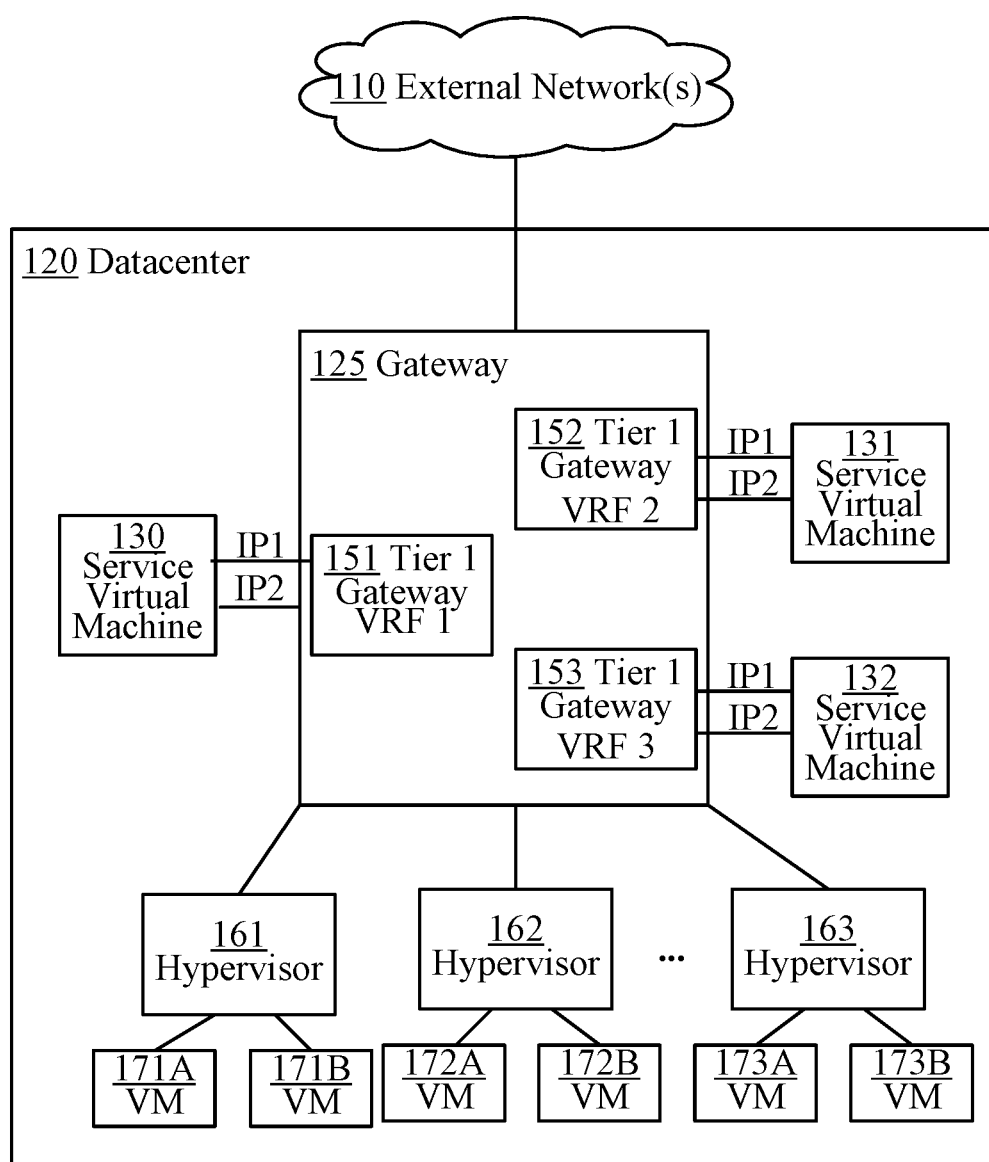
FIG. 2 is a block diagram depicting an example physical implementation view of a multi-VRF and multi-service insertion.

FIG. 2 is a block diagram depicting an example physical implementation view of a multi-VRF and multi-service insertion. In FIG. 2, tier 1 gateways 151-153 have associated corresponding VRF identifiers. For example, tier 1 gateway 151 is associated with a VRF1 identifier, and therefore is configured to handle traffic according to a routing table associated with the VRF1; tier 1 gateway 152 is associated with a VRF2 identifier, and therefore is configured to handle traffic according to a routing table associated with the VRF2; while tier 1 gateway 153 is associated with a VRF3 identifier, and therefore is configured to handle traffic according to a routing table associated with the VRF3.

Each of the routing tables may be unique to a tenant, and the corresponding tier 1 gateway may be used to handle packets for the unique tenant. For example, if datacenter 120 is configured to support multiple tenants, then each of the tenants may be assigned to a different tier 1 gateway. Hence, a particular tier 1 gateway may be configured to handle the traffic to and from a particular tenant, and the particular tier 1 gateway may be assigned to a particular VRF identifier.

2. Example Configuration with Multiple VRFS

Each of tier 1 gateways 151-153 may be configured with a plurality of interfaces. Each plurality of interfaces may include an uplink interface, a downlink interface, and a pair of interfaces that the gateway uses to communicate packets to and from a service virtual machine ("SVM"). Each of the interfaces may have an IP address or a pair of IP addresses. The uplink interface and the downlink interface are configured to handle north-south and south-north traffic. The pair of interfaces to the SVM are configured to handle traffic to and from the SVM. In the depicted example, tier 1 gateway 151 has a pair of interfaces having assigned IP1-IP2 addresses to communicate with SVM 130, tier 1 gateway 152 has a pair of interfaces having assigned IP1-IP2 addresses to communicate with a SVM 131, and tier 1 gateway 153 has a pair of interfaces having assigned IP1-IP2 addresses to communicate with a SVM 132.

In an embodiment, an approach is described to allow tier 1 gateways 151-153 to use the same IP1-IP2 address pair to communicate with their corresponding SVMs, but still direct the packets to different SVMs, such as SVM 130, SVM 131 and SVM 132, respectively. The approach includes a control data path process described in detail in FIG. 7, and a data flow service insertion process described in detail in FIG. 8.

3. Example Gateway and Service Virtual Machine Configuration

Figure 3:
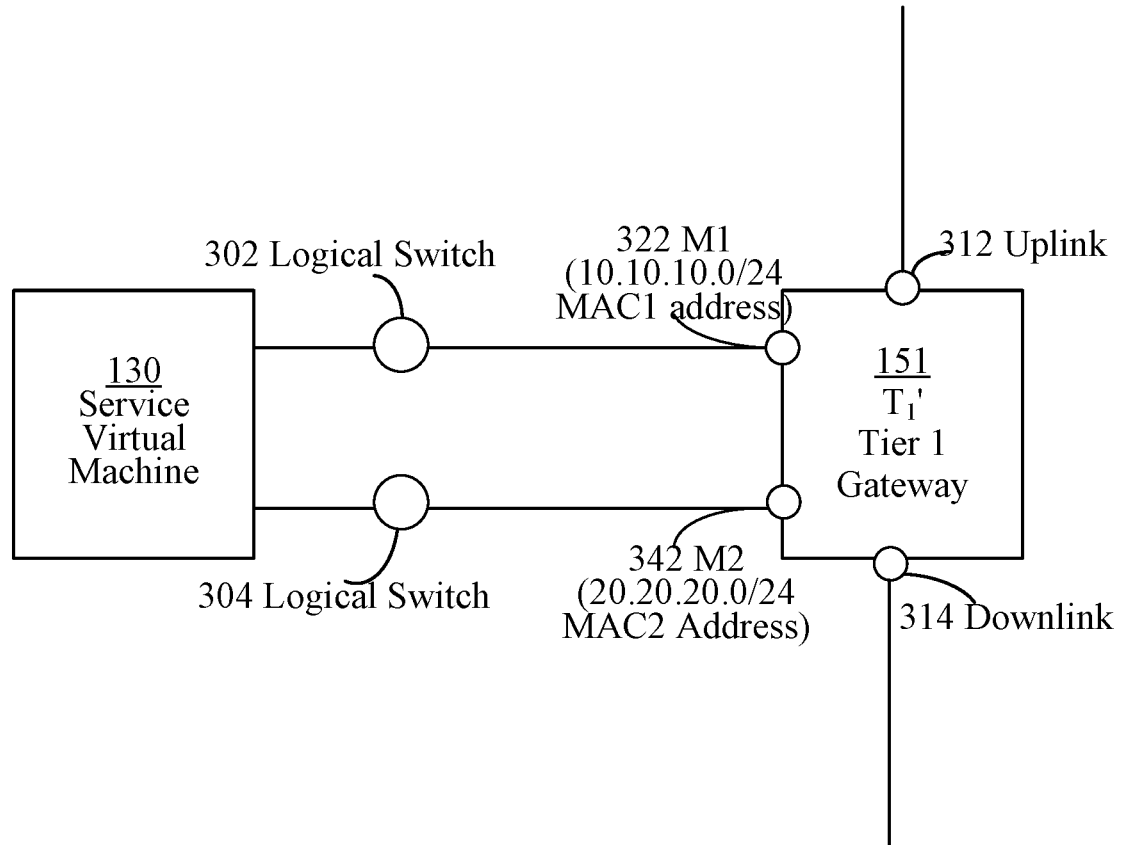
FIG. 3 is a block diagram depicting a gateway and a service virtual machine.

FIG. 3 is a block diagram depicting a gateway and a service virtual machine. The gateway is a tier 1 gateway, also referred to as a $T_1'$ gateway 151, that communicates with SVM 130.

Suppose that $T_1'$ gateway 151 received a packet that was sent by an external entity to datacenter 120. Upon receiving the packet, $T_1'$ gateway 151 determines whether the packet needs to be redirected to SVM 130, and if it does, redirects the packet to SVM 130. SVM 130 inspects the packet and determines whether to allow or block the packet. If the packet is allowed, then SVM 130 forwards the packet back to $T_1'$ gateway 151 so that $T_1'$ gateway 151 may route the packet toward the packet destination. If the packet is blocked, then the packet may be dropped.

To determine whether to allow or block a packet, SVM 130 inspects the packet and determines attributes of the packet. The attributes may include a source address of the packet sender, a destination address of the packet destination, a protocol identifier, and the like. Based on the attributes, SVM 130 may determine whether to allow or drop the packet.

In an embodiment, servicing a packet by SVM 130 may include L2-L4 processing. The L2 processing may include checking the packet's source MAC address and the destination MAC address. The L3 processing may include checking the IP/MAC addresses, and the L4 processing may include checking also the port addresses. Additional processing, such as L4-L7 processing may be performed by service virtual machines that may be, for example, configured to perform an intrusion detection and/or an intrusion prevention.

In an embodiment, $T_1'$ gateway 151 detects a packet on an uplink interface 312 and puts a packet on an M1 interface 322 that is connected to a logical port of a logical switch 302. M1 interface 322 may be identified by an assigned MAC1 address and a subnet network IP address. In the depicted example, the subnet address is 10.10.10.0/24; however, other subnets may be used as well.

To put a packet on M1 interface 322, $T_1'$ gateway 151 uses a local IP address of M1 interface and a next_hop address, wherein both addresses belong to the same subnet. In the depicted example, if the subnet address is 10.10.10.0/24, then the local address may be 10.10.10.1, while the next_hop address may be 10.10.10.2. As described in detail in FIG. 8, the local address may be taken from an IP1-IP2 pair determined for the packet based on a policy table, while the next_hop address may be determined a picked-at-random IP address that belongs to the subnet.

Once the packet that is put on M1 interface 322, it may be detected by logical switch 302. Logical switch 302 may be a separate switch from a logical switch 304 or may be implemented as one switch together with switch 304. Determination as to whether to implement two separate switches 302 and 304 or one combined switch 302-304 (not shown in FIG. 3) depends on a mode in which SVM 130 operates.

Depending on implementation, a switch configuration may include two separate L2 switches 302 and 304 (as shown in FIG. 3) or one combined L3 switch. If SVM 130 is a L2 SVM, then SVM 130 receives data on one network interface controller ("NIC") and sends the data out on another NIC, and therefore, two separate L2 logical switches are used, such as logical switch 302 and logical switch 304. However, if SVM 130 is operating in a L3 mode, then one L3 logical switch (not shown in FIG. 3) can handle communications in both directions. The combined L3 switch can be configured to facilitate the communications in both directions and gateway 151 may use one IP address from an IP1-IP2 pair for communicating packets in one direction and another IP address from the IP1-IP2 pair for communicating packets in another direction. Gateway 151 may use ARP requests to resolve the MAC addresses for the corresponding interfaces.

Suppose that SVM 130 detects a packet from logical switch 302. SVM 130 processes the packet, and, if the packet is allowed, puts the packet on an output interface of SVM 130 to allow logical switch 304 to put the packet on a M2 interface 342. M2 interface 342 may be identified by an assigned MAC2 address and a subnet network IP address. In the depicted example, the subnet address is 20.20.20.0/24; however, other subnets may be used as well.

To put the packet on M2 interface 342, logical switch 304 uses an IP address of M2 interface. In the depicted example, if the subnet address is 20.20.20.0/24, then the local address may be 20.20.20.1, corresponding to an IP2 taken from an IP1-IP2 pair determined for the packet based on a policy table and a rule table, as described in FIG. 8.

4. Example Rules

FIG. 4 depicts an example rule table. A rule table 400 is used by a gateway to determine whether to redirect a packet to a service virtual machine for servicing. The rule table may be organized as, for example, a data structure or a memory space addressable using a data pointer.

In the example depicted in FIG. 4, rule table 400 is a data structure that has rows and columns. The columns include a source address column 402, a destination address column 404, a source port address 406, a destination port column 408, and an action column 410. Other rule tables may include additional columns. Each row in rule table 400 corresponds to a different rule. In the depicted example, a rule 420 specifies that if attributes of a particular packet correspond to "MySource" as a source address, "MyDestination" as a destination address, "MySPort" as a source port, and "MyDPort" as a destination port, then the packet should be redirected according to information included in a redirect_UUID construct.

In an embodiment, a redirect_UUID construct includes a hyperlink to a universally unique identifier ("UUID") blob. A UUID is usually a number or an alphanumerical string that uniquely identifies an entity among other entities in a computer system and/or a network. For practical purposes, the UUID is unique in a system/network, and identifies only one identity, such as a virtual machine, a computer interface, a service, and the like. The UUIDs may be used to index a policy table, as described later.

In an embodiment, a UUID blob is a data structure configured to store information about a service to be provided by a service virtual machine to packets. The UUID blob may comprise a UUID of an interface to be used to communicate packets from a gateway to a service virtual machine, and a UUID of an interface to be used to receive packets from the service virtual machine by the gateway. The UUID blob may also include one or more properties of the service or the service virtual machine, and an IP1-IP2 pair of addresses of the interfaces that the gateway may use to communicate with the service virtual machine.

5. Redirecting Packets to Service Virtual Machines 5.1. Example Policy Table

Figures 5A, 5B:
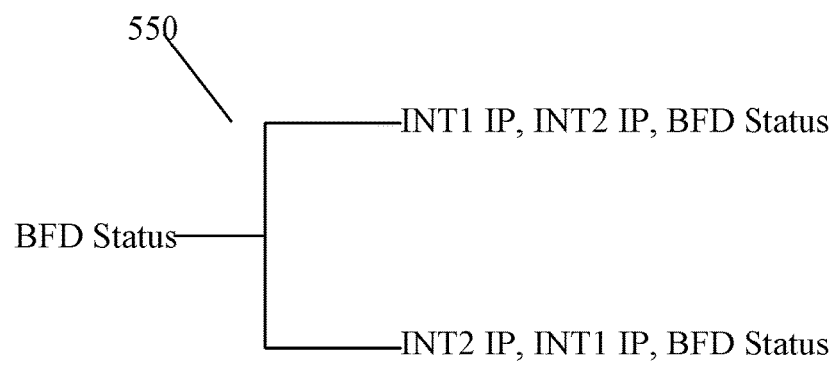
FIG. 5A is a block diagram depicting an example policy table.
FIG. 5B is a block diagram depicting an example BFD status data structure.

FIG. 5A is a block diagram depicting an example policy table. A policy table 500 comprises information that a gateway uses to redirect a packet to a service virtual machine and that the gateway uses to determine an interface on which the gateway may expect the packet if the service virtual machine determined that the packet is allowed.

Policy table 500 may include a plurality of rows and columns. The rows may be indexed using a key. A key may include a UUID, also referred to as a policy_UUID. The UUID may correspond to a redirect_UUID described in rule table 400 in FIG. 4. The columns may comprise a policy_UUID column 502, a next_hop address column 504, an interfaces column 506, a BFD_status column 508, a failure configuration column 510, and other columns, such as a column 505 described later. Next_hop address column 504 may be used to store a next_hop address used to redirect packets from the gateway to the service virtual machine. BFD_status column 508 may be used to store a hyperlink to a data structure that includes information indicating whether the service virtual machine is up or down and/or whether a connection to the service virtual machine is up or down. Examples of BFD status data structures are described in FIG. 5B. Failure configuration column 510 may be used to store a hyperlink to a data structure that includes information about a procedure that may be followed if the service virtual machine is down and/or the service virtual machine itself is nonoperational.

In an embodiment, a service virtual machine is not required to implement any BFD support. Specifically, the service virtual machine is not required to handle special-case BFD packets other than to allow them to pass through, either through a rule or by separating them from regular non-BFD traffic. The service virtual machine is not terminating the BFD protocol, it merely acts as a pass-through. Therefore, the presented approach does not necessarily require any specific support from the service virtual machine to properly work with the platform.

In a depicted example, a row 520 in policy table 500 is indexed using a UUIDA. Row 520 may include a next_hopA address, a pair of IP1-IP2 addresses, a hyperlink1 to the BFD status data structure, and a hyperlink2 to the failure configuration data structure. A row 521 in policy table 500 is indexed using a UUIDB. Row 521 may include a next_hopB address, a pair of IP3-IP4 addresses, a hyperlink3 to the BFD status data structure, and a hyperlink4 to the failure configuration data structure. Thus, if a gateway detects a packet, and determines from rule table 400 that a UUID is the UUIDA, then the gateway may use the UUIDA to search policy table 500 and find row 520. Then, based on row 520, the gateway determines the next_hopA, the IP1-IP2 pair, the hyperlink1 and the hyperlink2. The gateway may use the IP1 and the next_hopA to determine an address of the M1 interface onto which the gateway may put the packet to have the packet serviced by the service virtual machine.

In an embodiment, policy table 500 includes an IP address pair that is different than an IP address pair in row 521. In other embodiments, however, the pairs may be the same. The examples are described in FIG. 13.

5.2. Example BFD Status Data Structure

FIG. 5B is a block diagram depicting an example bidirectional forwarding detection ("BFD") status data structure. In the depicted example, a BFD status data structure 550 stores data that indicates status of communications connections in one direction and status of communications connections in an opposite direction. In a first direction, the status information includes, for example, an IP address of a first interface implemented on the gateway, an IP address of a second interface implemented on the gateway, and a BFD status indicator, which may be either up or down. In a second direction, the status information includes, for example, an IP address of the second interface implemented on the gateway, an IP address of the first interface implemented on the gateway, and a BFD status indicator, which may be either up or down. The status for each of the two directions is determined by sending BFD packets to the service virtual machine in each of the directions.

In an embodiment, health of a service machine, such as firewall service virtual machine, and health of connections to and from the service machine is determined using the functionalities of the BFD protocol. BFD may be used to detect faults between two packet forwarding entities connected by a communications link. In this example, the entities may include a gateway and the service virtual machine.

BFD may be used to establish a communications session between a gateway and a service virtual machine over communications links and to exchange BFD control messages or packets. If a plurality of links exists between the gateway and the service machine, then the multiple BFD sessions may be established to monitor each of the links. The session may be established using a three-way handshake, and may be torn down using the same approach.

By exchanging BFD control messages with a service virtual machine at regular intervals, the gateway may monitor the service machine to determine whether the service machine is functioning properly and is reachable. As long as the service machine timely responds to the BFD control messages, the gateway determines that the service machine and the corresponding communications links are operational. However, if the service machine does not respond to, for example, three consecutive BFD control messages, then the gateway may determine that the service machine of any of the communications links is down.

In an embodiment, a gateway generates a BFD packet and transmits, from a first interface, the BFD packet to a service virtual machine periodically, such as every second. If the service machine is operational, then the machine will receive the BFD packet and will redirect the packet back to the gateway. Upon receiving the packet on a second interface, the gateway determines that the service machine and the communications links to and from the machine are operational. In this situation, the gateway will update the BFD status in BFD status data structure 550 for a first direction to up.

However, if the service virtual machine is not operational or if any of the links to and/or from the service virtual machine is down, then the gateway will determine that the service machine is down because the gateway is not receiving, on the second interface, the BFD packets from the service machine. In this situation, the gateway will update the BFD status in BFD status data structure 550 for a first direction to down.

A similar process is implemented for the opposite direction. If the gateway generates a BFD packet and transmits, from the second interface, the BFD packet to the service virtual machine, but the gateway does not receive the BFD packet, on the first interface, from the service virtual machine, then the gateway will update the BFD status in BFD status data structure 550 for the second direction to down. However, if the gateway receives, on the first interface, the BFD packet from the service machine, then the gateway will update the BFD status in BFD status data structure 550 for the second direction to up.

Each of the directions may be tested periodically by the gateway, and the BFD status may be updated for each direction if the status changes for that direction.

6. Multi-Service Configurations

6.1. Multi-Service Configurations with Different IP Address Pairs

Figure 6A:
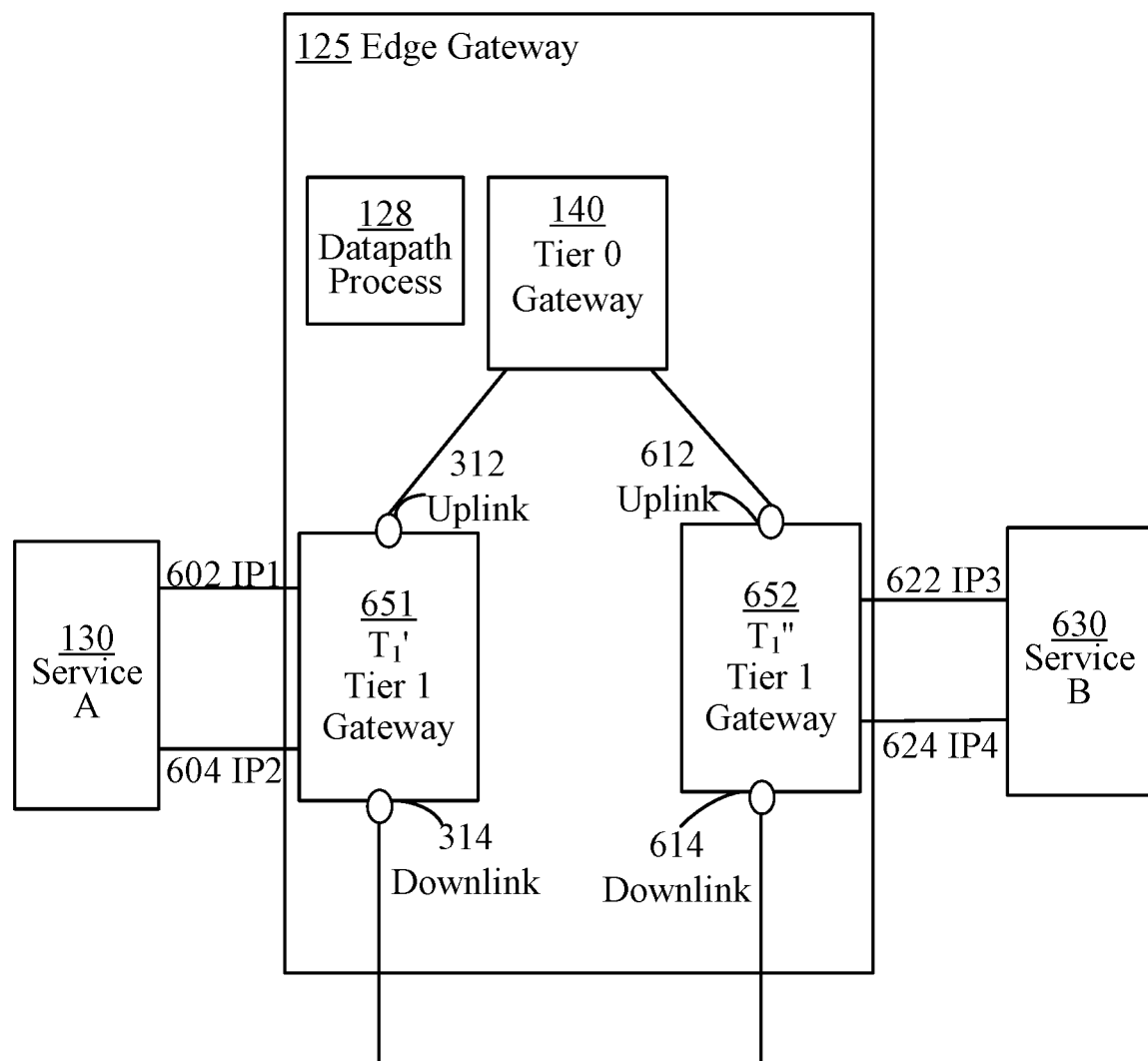
FIG. 6A is a block diagram depicting an example physical implementation view of a multi-service insertion with different IP address pairs.

FIG. 6A is a block diagram depicting an example physical implementation view of a multi-service insertion with different IP address pairs. In the depicted example, a tier 1 gateway 651 uses an IP1-IP2 pair to communicate with SVM 130, while a tier 1 gateway 652 uses an IP3-IP4 pair to communicate with an SVM 630.

In an embodiment, an approach is described to allow tier 1 gateways 651-652 to use different address pair to communicate with their corresponding SVMs, but still direct the packets to their corresponding SVMs. The approach includes a control data path process described in detail in FIG. 7, and a data flow service insertion process described in detail in FIG. 8.

Each of tier 1 gateways 651-652 may be configured with a plurality of interfaces. Each plurality of interfaces may include an uplink interface, a downlink interface, and a pair of interfaces that the gateway uses to communicate packets to and from an SVM. In the depicted example, $T_1'$ gateway 651 has an uplink interface 312, a downlink interface 314 and a pair of interfaces identified by an IP1 address 602 and an IP2 address 604, while $T_1''$ gateway 652 has an uplink interface 612, a downlink interface 614 and a pair of interfaces identified by an IP3 address 622 and an IP4 address 624. The pair of interfaces identified by the IP1-IP2 pair is used by $T_1'$ gateway 651 to communicate with SVM 130, while the pair of interfaces identified by the IP3-IP4 pair is used by $T_1''$ gateway 652 to communicate with SVM 630.

6.2. Multi-Service Configurations with the Same IP Address Pairs

Figure 6B:
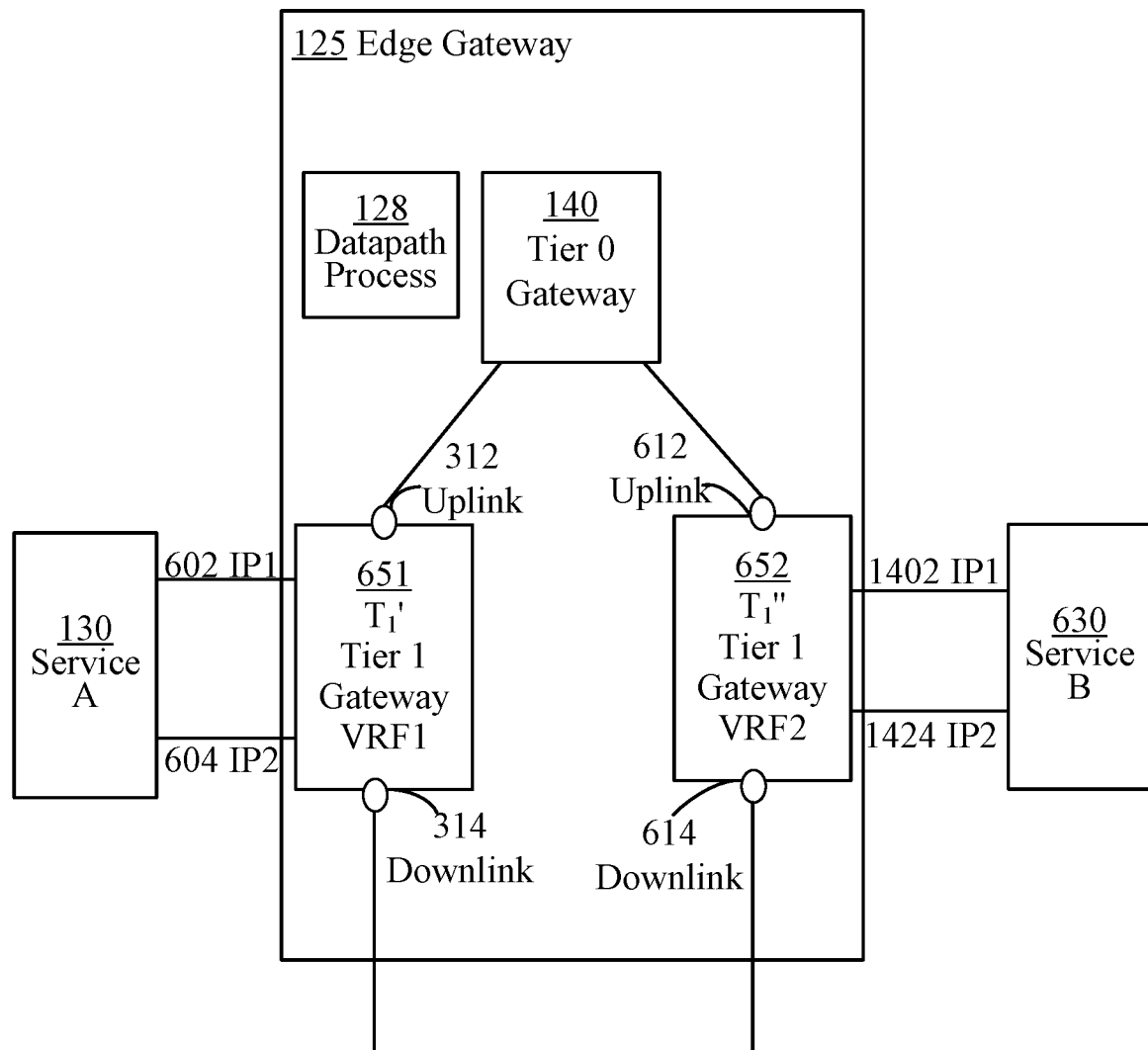
FIG. 6B is a block diagram depicting an example physical implementation view of a multi-VRF and multi-service insertion with the same IP address pairs.

FIG. 6B is a block diagram depicting an example physical implementation view of a multi-VRF and multi-service insertion with the same IP address pairs. In contrast to the configuration described in FIG. 6A, the configuration described in FIG. 6B depicts that both gateways 651 and 652 use the same IP1-IP2 address pair, but that they communicate with different SVMs. Specifically, gateway 651 uses the IP1-IP2 address pair to communicate with SVM 130, while gateway 652 uses the IP1-IP2 address pair to communicate with SVM 630.

In an embodiment, an approach is described to allow tier 1 gateways 651-652 to use the same IP1-IP2 address pair to communicate with their corresponding SVMs, but still direct the packets to their corresponding SVMs, such as SVM 130 and SVM 630, respectively. The approach includes a control data path process described in detail in FIG. 7, and a data flow service insertion process described in detail in FIG. 8.

In an embodiment, an approach implements VRF identifiers to allow different gateways to use the same IP1-IP2 address pairs to communicate with different SVMs. As shown in FIG. 6B, tier 1 gateways 651-652 have associated corresponding VRF identifiers. For example, $T_1'$ gateway 651 is associated with a VRF1 identifier, and therefore is configured to handle traffic according to a routing table associated with the VRF1, while $T_1''$ gateway 652 is associated with a VRF2 identifier, and therefore is configured to handle traffic according to a routing table associated with the VRF2.

To allow different gateways to use the same IP1-IP2 address pair to communicate with different SVMs, a policy table used by the gateways have policy records that comprise a field for storing a VRF identifier. Referring again to policy table 500, described in FIG. 5A, a column 505 may be used to store the VRF identifiers for the policy records. For example, if it is assumed that policy record 520 corresponds to a service that SVM 130 provides to packets directed to SVM 130 by $T_1'$ gateway 651, then policy record 520 may include, in field 505, the VRF1 identifier. If it is assumed that policy record 521 corresponds to a service that SVM 630 provides to packets directed to SVM 630 by $T_1''$ gateway 652, then policy record 521 may include, in field 505, the VRF2 identifier.

In an embodiment, inserting a plurality of services, having the same IP pairs, on multiple VRFs is enabled by associating a unique VRF identifier with each gateway, and using a datapath global policy configuration table that includes, among other things, a mapping between the service identifiers and the VRF identifiers. An example of such a table is described in FIG. 13.

In an embodiment, inserting a plurality of services, having the same IP1-IP2 pairs, requires modifications to a policy table. For example, to facilitate the service insertion of the services having the same IP1-IP2 pairs, the policy table may need to include a column for VRF identifiers, such as column 1305 in policy table 1300 shown in FIG. 13. Furthermore, to facilitate the service insertion for both north-south and south-north direction, a BFD table may need to include separate rows for sessions in each of the directions. As described later in FIG. 14, a BFD session S1 for a VRF1 may be associated with an IP1 address as a source address and an IP2 address as a destination address, while a BFD session S2 for the same VRF1 may be associated with the IP2 address as a source address and the IP1 address as a destination address.

7. Example Control Path Process

Figure 7:
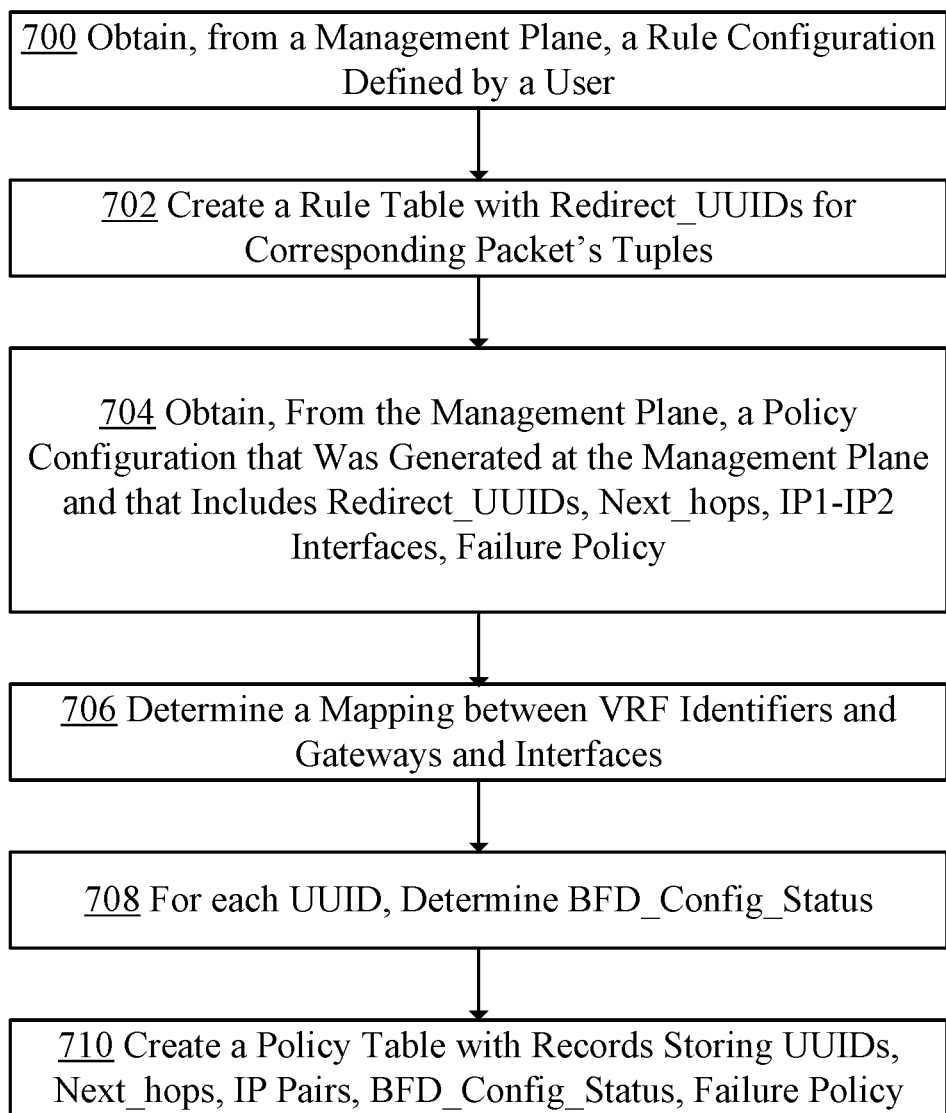
FIG. 7 is an example flow chart for a control path process.

FIG. 7 is an example flow chart for a control path process. In an embodiment, the control path process is used to enable service insertion and to enable redirecting packets from edge gateways to service virtual machines providing the services. The process may be executed by a datapath process, such as datapath process 128 executing in gateway 125.

In step 700, a datapath process obtains a rule configuration. The rule configuration may include specifications of relationships between rules and services available from service virtual machines deployed in a datacenter. The rule configuration may encode services using UUIDs, described above. For example, the rule configuration may specify which packets need to be inspected by a particular firewall service virtual machine by performing a service that is identified using a particular UUID.

In step 702, the datapath process creates a rule table based on, at least in part, the rule configuration. The rule table may include one or more rule records, and each rule record may comprise one or more packet attributes and a redirection identifier. The rule record may include, for example, a particular IP address of a packet source, a particular IP address of a packet destination, and an action indicating whether a packet having the particular source IP address and the particular destination IP address is to be redirected to a service machine. The redirection may be encoded as a redirect_UUID, as described above.

In step 704, the datapath process obtains a policy configuration. The policy configuration may be obtained from a management plane and may include information configured by the management plane for the datacenter. Each policy record may include a redirection identifier, a next_hop, and an address pair for interfaces implemented on an edge gateway. A particular policy record may include, for example, information indicating that redirecting a packet to perform a service comprises using the interfaces identified by the address pair for the interfaces assigned to an edge gateway and using the next_hop to redirect the packet from the gateway to a service virtual machine that is configured to perform the service. The redirecting of the packet to the service virtual machine may be indicated using, for example, a redirect_UUID construct, described above. A policy record may also include a hyperlink to failure policy which is to be followed if communications with the service virtual machine are not attainable.

In step 706, the datapath process determines a mapping between VRF identifiers and gateways, and then interfaces implemented on the gateways. The mapping may be determined by issuing a get_VRFs command and collecting responses. The responses may indicate a mapping of VRF identifiers onto gateway identifiers of the edge gateways implemented in the datacenter. Then, a get_interfaces command may be issued for each VRF to determine a plurality of interfaces implemented in an edge gateway that belongs to the VRF.

For example, a get_interfaces_for_VRF1 command may be issued to request a plurality of interface identifiers of the interfaces implemented on a particular gateway that is mapped onto VRF1. The received plurality of interface identifiers may indicate an uplink interface, a downlink interface, an interface to be used to send packets from the gateway to a service machine, and an interface to be used to receive packets from the service machine by the gateway.

In step 708, the datapath process determines health of connections (in both directions) between gateways and corresponding service virtual machines. In this step, the datapath process creates two BFD sessions, one in each direction, for each VRF. The datapath process may use the BFD protocol functionalities to monitor the sessions and determine the status for each session.

Once a BFD session is established, the datapath process creates a BFD packet for the session. The packet may include a local IP address, a remote IP address, and other data. The packet is put on a first interface of the gateway (such as M1 322 interface of gateway 151) and awaited on a second interface of the gateway (such as M2 342 interface of gateway 151). The datapath process may await receiving the packet for a certain time, and if the packet is received, then the datapath process determines that the session is operational. Otherwise, the datapath process determines that the session is nonoperational. For example, if for some reason, the datapath process does not receive a response to its own BFD packet, then the datapath process may conclude that the service virtual machine and/or the communications links to/from the service machine are nonoperational.

The datapath process may store the results of the monitoring in a BFD data structure. An example of the BFD data structure is depicted in FIG. 14, described later.

In step 710, the datapath process generates a policy table based on, at least in part, the mapping and the policy configuration. The policy table may include one or more table records, and each table record may include a redirect_UUID, a next_hop, a VRF identifier, an address pair for interfaces, a hyperlink for a BFD status, and a hyperlink for a failure policy. The policy table may be searched using a redirect_UUID, described above. For a particular redirect_UUID, the policy table may include a VRF identifier, a next_hop to be used to redirect a packet from the edge gateway to a service machine configured to service the packet, an IP address pair of the interfaces implemented on the edge gateway corresponding to the VRF identifier, a hyperlink to a BFD status data structure (described above), and a hyperlink to a failure configuration data structure (described above).

8. Example Data Flow Process

Figure 8:
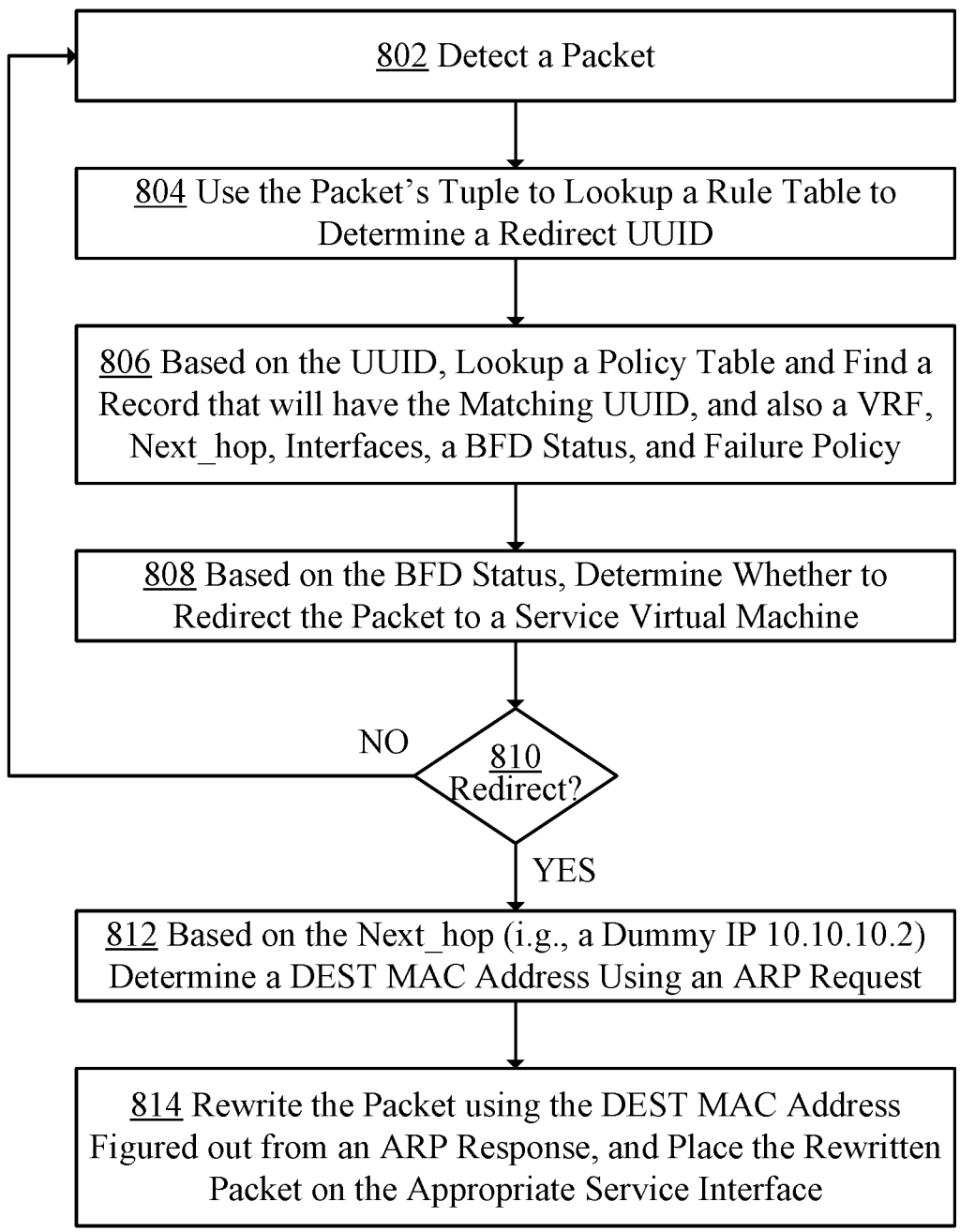
FIG. 8 is an example flow chart for a data flow process.

FIG. 8 is an example flow chart for a data flow process. In an embodiment, the data flow process is used to redirect packets detected by an edge gateway from the gateway to a service virtual machine that is configured to service the packet. The data flow process may be implemented in a gateway, such as gateway 651 or gateway 652, described in FIG. 6B. The process may be also implemented in gateway 140, described in FIG. 1.

In step 802, a data flow process executing in an edge gateway detects a packet received by the gateway. The packet may be detected on an uplink interface if the packet is transmitted in a north-south direction. However, if the packet is transmitted in a south-north direction, then the packet may be detected on a downlink interface.

Upon detecting the packet, the data flow process may determine one or more attributes for the packet. The attributes may include a source IP address, a source MAC address, a destination IP address, a destination MAC address, a source port, a destination port, and so forth.

In step 804, the data flow process determines whether the attributes of the packet match one or more rule attributes of any rule in a rule table. If a match is found, then, from a matching rule, the gateway determines a particular redirection identifier. For example, if the attributes of the packet match attributes 402-408 of rule 420 in table 400 in FIG. 4, then the data flow process extracts a redirect_UUID from, for example, column 410 of rule table 400 in FIG. 4.

In step 806, the data flow process uses the redirect_UUID to search a policy table to find a particular policy record in the policy table that is identified by the redirect_UUID. An example of the policy table is described in FIG. 13. The policy table is a global table, and therefore it is accessible to any gateway, including gateway 140, described in FIG. 1, and gateways 651-652, described in FIG. 6B.

From the particular policy record, the data flow process checks whether the gateway on which the data flow process is executing is associated with the same VRF identifier as the identifier included in the particular policy record. If the VRFs do not match, then the gateway provides the packet to that gateway that is associated with the VRF identifier indicated in the particular policy record and let a data flow process executing on that gateway to perform steps 802-814 of FIG. 8. For example, if the particular policy record includes a VRF1, but gateway 140 executing this data flow process is not associated with the VRF1, then gateway 140 may provide the packet to gateway 651 which is associated with the VRF1, and let a data flow process executing on gateway 651 to perform steps 802-814.

However, if the VRF identifier included in the particular policy record matches a VRF identifier assigned to a gateway on which the data flow process executes, then, in step 808, the data flow process determines whether an SVM configured to service the packet is operational and whether communications links to/from the SVM are operational. To check operability to and connectivity with the SVM, the data flow process extracts, from the particular policy record, a hyperlink) for a BFD status and an IP address pair.

The data flow process uses the hyperlink) to access a BFD table, such as BFD table 1400 in FIG. 14. Then, the data flow process uses the IP address pair to access a particular row in the BDF table. The row will correspond to a particular BFD session established for the pair of [source IP address, destination IP address] that matches in the IP address pair extracted from the particular policy record. Once the data flow process accesses the particular record, the data flow process determines whether the particular BFD session is up or down. For example, assuming that the particular row corresponds to a row 1420 in FIG. 14, the status of the particular BFD session is up, as shown in column 1408 in FIG. 14.

Based on, at least in part, the status of the particular BFD session, the data flow process determines whether to redirect the packet to the SVM.

If, in step 810, the data flow process determines that the particular BFD status indicates that the SVM is not reachable for some reason or that the SVM is nonoperative, then the data flow process proceeds to step 802, does not redirect the packet to the SVM, and instead, redirects the packet, for example, toward a destination of the packet.

However, if the particular BFD status indicates that the SVM is operational and reachable, then, in step 812, the data flow process redirects the packet to the SVM for applying a service to the packet.

Redirecting the packet to the SVM may include, as shown in step 814, resolving a particular MAC address based on, at least in part, the particular next_hop extracted from the particular policy record, encapsulating the packet with the particular MAC address, and redirecting the packet toward the SVM from an interface indicated by a first IP address in the particular IP address pair.

This may be illustrated using the following example. Suppose that the attributes of a detected packet match attributes of rule 410 in rule table 400 in FIG. 4. From rule 410, the data flow process extracts the redirect_UUID. Suppose that the redirect_UUID corresponds to a UUIDA. Then, the data flow process uses the UUIDA to lookup policy table 1300, described in FIG. 13, to find a record 1320. Based on the record 1320, the data flow process determines a pair of IP addresses of the interfaces on a gateway identified by a VRF1, as shown in FIG. 13. Assuming that SVM 130 configured to provide services to the packet is operational and reachable, the data flow process generates an ARP request for each of the IP addresses in the IP1-IP2 pair, transmits the ARP requests to an address resolution server, and in response, receives a pair of MAC addresses. The pair of MAC addresses may include, for example, a MAC1 address of M1 interface 322 and a MAC2 address of M2 interface 342 of gateway 151, shown in FIG. 3. Continuing with the assumption that SVM 130 is operational and reachable, the data flow process puts the packet on the M1 interface of gateway 151 so that SVM 130 may service the packet.

Once SVM 130 detects the packet, SVM 130 processes the packet to determine whether to allow or block the packet. If the packet is to be blocked, then the service process may drop the packet.

However, if SVM 130 determines that the packet is allowed, then SVM 130 encapsulates the packet with the MAC2 address and puts the packet on an output interface of SVM 130 so that the packet is provided on M2 interface 342 of gateway 151, and then detected by gateway 151. Subsequently, gateway 151 puts the packet on a downlink interface, and the packet is routed toward its destination.

However, if an SVM configured to provide services to the packet is not operational or reachable, then the data flow process may use a hyperlink2 from column 1320 in policy table 1300 (see FIG. 13) to access a failure_policy_configuration_file to determine how to dispose the packet. For example, the packet may be routed toward its destination as if the packet were allowed, or the packet may be dropped as if the packet were blocked.

9. Example BFD Process

Figure 9:
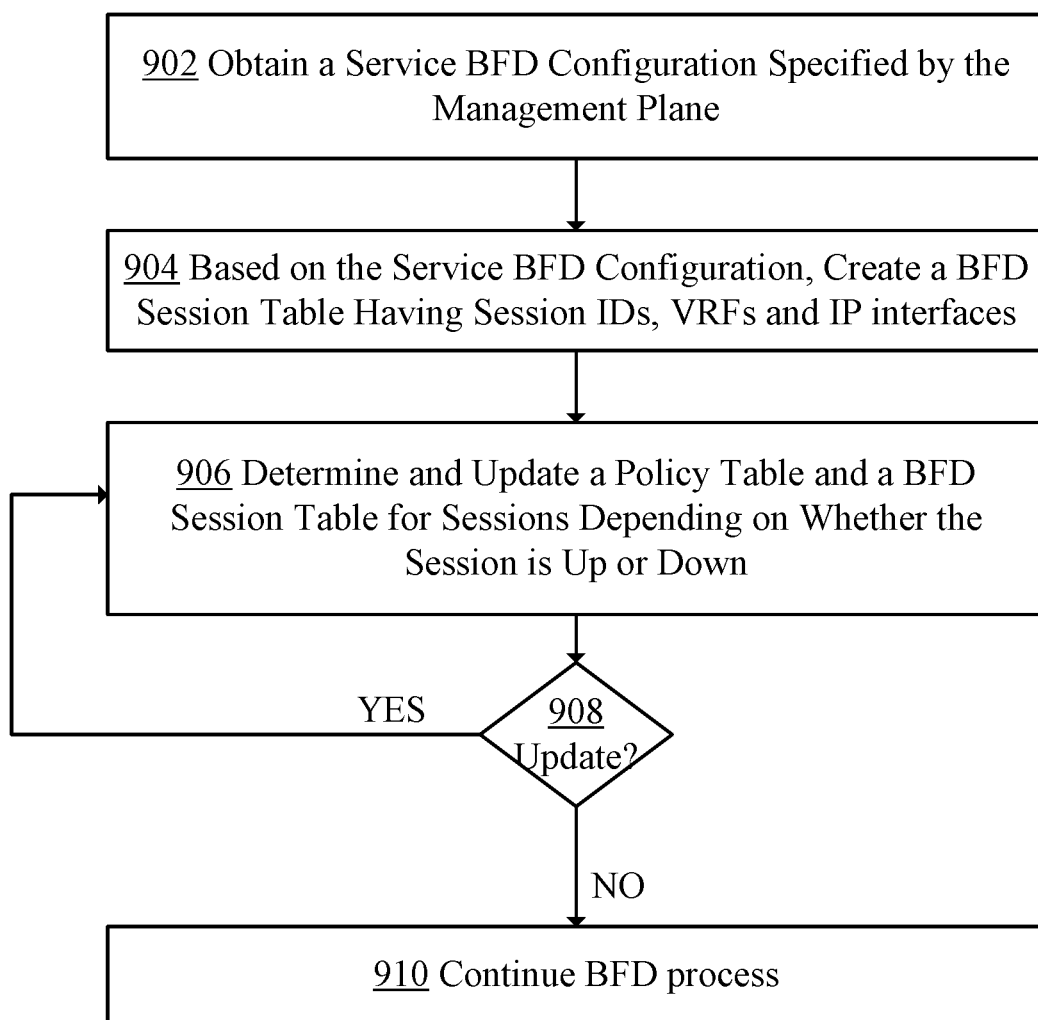
FIG. 9 is an example flow chart of a BFD process.

FIG. 9 is an example flow chart of a BFD process. The BFD process is executed to collect data about operability and accessibility of services to be performed on packets by service virtual machines. The process may be executed by, for example, a daemon implemented in gateway 125 or a computer program implemented in any other component of datacenter 120.

In step 902, a BFD process obtains a service BFD configuration file. The BFD configuration file is usually obtained from a management plane which creates the file according to configuration specification for datacenter 120. The BFD configuration file may include information capturing relationships between BFD session identifiers, VRF identifiers, IP address pairs, and BFD session statuses. For example, if gateway 151 should use SVM 130 to perform certain services on packets, then the BFD configuration file may include information about two sessions: a session S1 which is a BFD session established from gateway 151 to SVM 130 and then to gateway 151 where an IP1 address corresponds to an M1 interface of gateway 151 and an IP2 address corresponds to an M2 interface on gateway 151; and a session S2 which is a BFD session established from gateway 151 to SVM 130 and then to gateway 151 where the IP2 address corresponds to the M1 interface of gateway 151 and the IP2 address corresponds to the M2 interface on gateway 151. The sessions S1 and S2 are established as being in opposite directions.

In step 904, the BFD process uses the BFD session information to generate a BFD table. An example of the BFD table is described in FIG. 14.

In step 906, the BFD process determines the status for each session. If the status of a session has changed, then the BFD process updates both a policy table and a BFD session table to indicate the status change. For example, if a S1 session for a particular VRF is operational and reachable, then the BFD process updates the policy table to indicate that the status is up and marks that session in the BFD session table as being up. However, if a S1 session for a particular VRF is nonoperational, then the BFD process updates the policy table to indicate that the status is down and marks that session in the BFD table as being down.

In step 908, the BFD process continues monitoring the sessions identified in the BFD table. If the status of a session changes, then, in step 906, the BFD process updates the status for that session in the BFD table. Otherwise, the BFD process continues in step 910.

10. Example Get VRF Commands

In an embodiment, an expansion of VRF technology includes generating a mapping between VRF identifiers and edge gateway identifiers. The mapping may be obtained by a gateway by issuing a get VRF command. In response to issuing the command, the gateway receives mappings between the VRF identifiers and identifiers of the gateways. The mappings may be initially configured by a central controller or a management control plane, and the different ways of configuring the mappings go beyond the scope of this disclosure.

Figure 10:
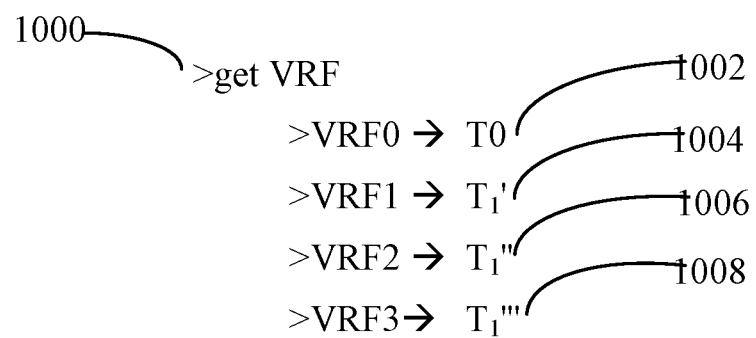
FIG. 10 is an example get VRF command.

FIG. 10 is an example get VRF command. In the depicted example, in response to issuing a get VRF command 1000, an edge gateway received the mappings which indicate that a VRF0 identifier is mapped onto an identifier of a Tier 0 gateway, as shown by an indicator 1002; a VRF1 identifier is mapped onto an identifier of a $T_1'$ gateway, as shown by an indicator 1004; a VRF2 identifier is mapped onto an identifier of a $T_1''$ gateway, as shown by an indicator 1006, and a VRF3 identifier is mapped onto an identifier of as shown by an indicator 1008. In other examples, the mappings may be different.

11. Example Get Interfaces Commands

In an embodiment, a gateway may issue a get interfaces for VRFx command to obtain information about the interfaces that are implemented on the gateway. For example, a Tier 0 gateway may issue the get interfaces VRF0 command to obtain UUIDs of all interfaces that the Tier 0 gateway implements. In response to issuing the command, the gateway may receive information about an UUID of an uplink of the Tier 0 gateway, an UUID of a downlink of the Tier 0 gateway, and UUIDs of other links, if such exist. The UUIDs are described in detail in previous sections.

In an embodiment, a Tier 1 gateway is configured to issue a get interfaces for VRF1 command to obtain UUIDs of all interfaces that the Tier 1 gateway implements. In response to issuing the command, the gateway may receive information about an UUID of an uplink of the Tier 1 gateway, an UUID of a downlink of the Tier 1 gateway, and UUIDs of other links, if such exist.

Figure 11:
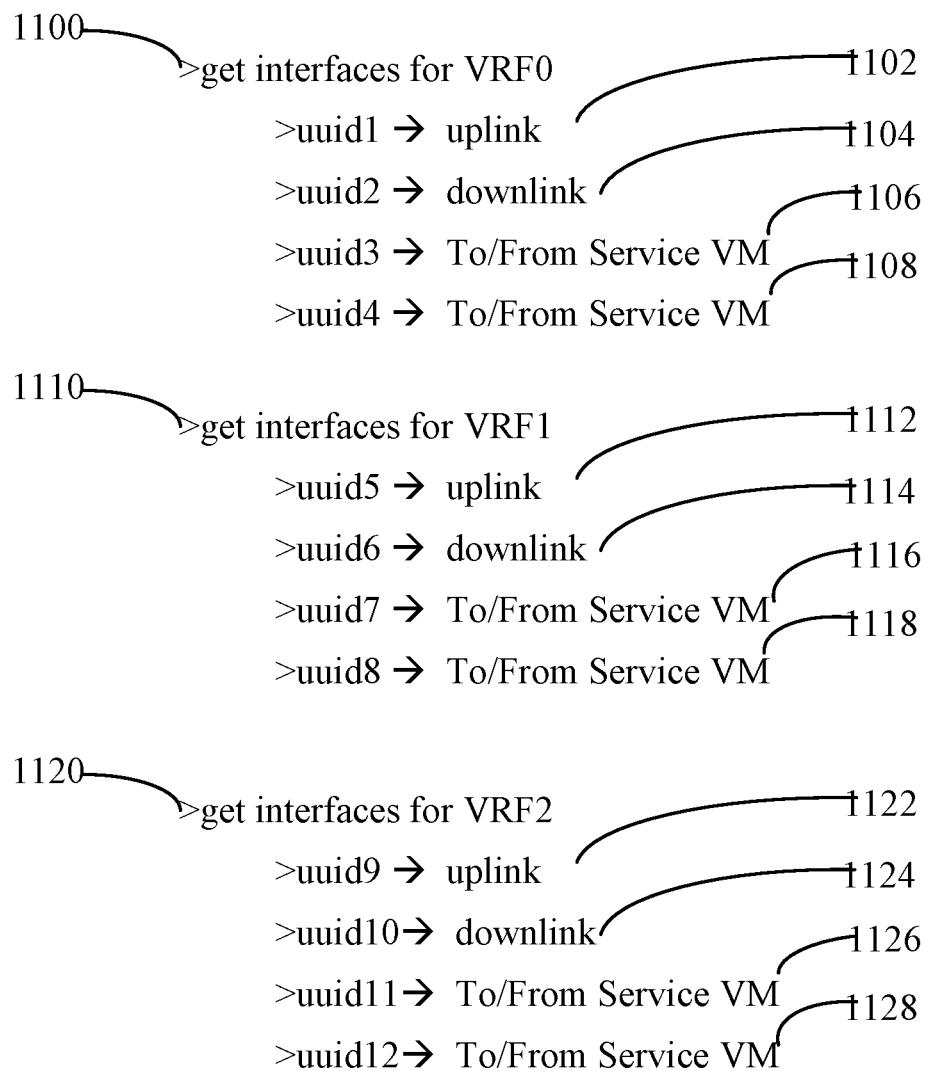
FIG. 11 is an example get interfaces command.

FIG. 11 is an example get interfaces command. In the depicted example, the following commands were issued: a get interfaces for VRF0 1100, a get interfaces for VRF1 1110, and a get interfaces for VRF2 1120. In response to command 1100, several UUIDs were displayed, including UUIDs 1102-1108. In response to command 1110, several UUIDs were displayed, including UUIDs 1112-1118. In response to command 1120, several UUIDs were displayed, including UUIDs 1122-1128.

12. Example UUID Blob Data Structures

Figure 12:
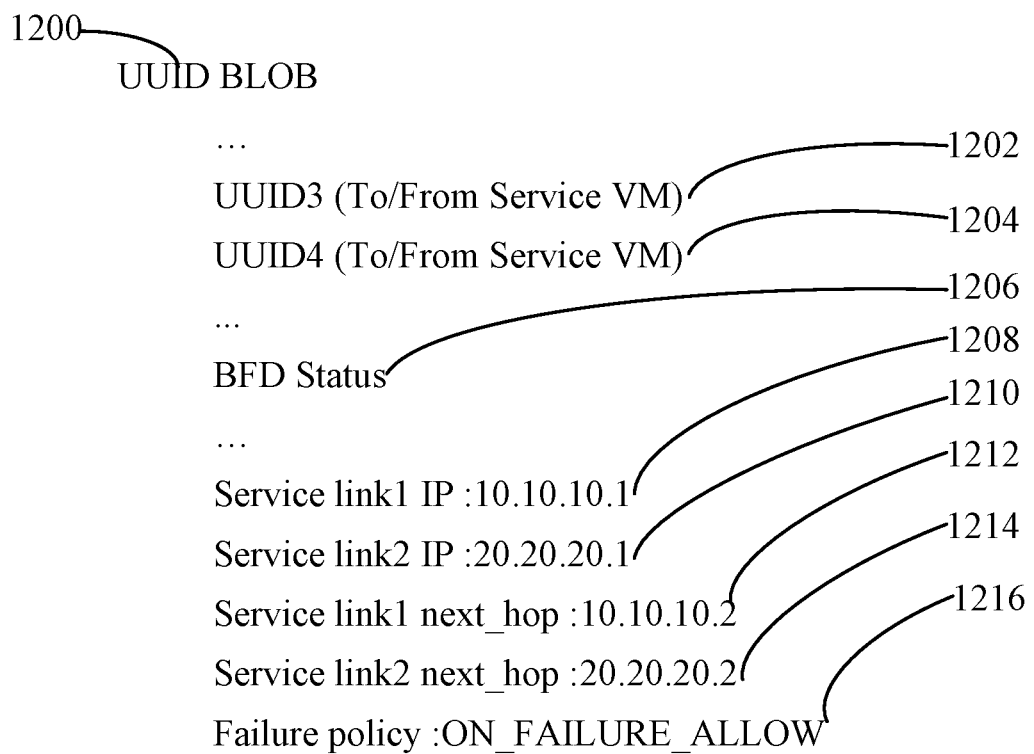
FIG. 12 is an example UUID blob data structure.

FIG. 12 is an example UUID blob data structure. UUID blobs may be data structures or memory spaces used to store information useful to service insertion processes. An example UUID blob 1200 is a data structure that is configured to store attributes of the UUID. The attributes may include a UUID3 (to/from an SVM) 1202, a UUID4 (to/from an SVM) 1204, a BFD status 1206, a service link1 IP address 1208, a service link2 IP address 1210, a service link1 next_hop address 1212, a service link2 next_hop address 1214, a failure policy 1216, and others.

13. Example Datapath Global Configuration Tables

FIG. 13 is an example datapath global configuration table. An example datapath global policy configuration table 1300 may include a plurality of rows and a plurality of columns. The columns may include a key column 1302, a result column 1304, a VRF column 1305, an interfaces column 1306, a BFD status 1308, and a failure configuration column 1310. Contents of the columns are described above.

An example row 1320 includes a UUIDA, a next_hopA, a VRF1, an IP1-IP2 pair, a hyperlink1 and a hyperlink2. An example row 1321 includes a UUIDB, a next_hopB, a VRF2, an IP1-IP2 pair, a hyperlink3 and a hyperlink4. Contents of the rows are described above.

14. Example BFD Tables

FIG. 14 is an example BFD table. In an embodiment, a datapath process generates a BDF table 1400 which includes rows and columns. The rows correspond to sessions, wherein two S1 and S2 sessions are created for each VRF identifier. The columns include a session identifier column 1402, a VRF identifier column 1404, a source IP address column 1405, a destination IP address column 1406, and the status column 1408.

For a given VRF, and for a given IP address pair, BFD table 1400 includes two rows. For example, for a VRF1, BFD table 1400 includes a row 1420 and a row 1422. Row 1420 stores data for a session S1, while row 1422 stores data for a session S2.

If an SVM associated with the VRF1 is operational and if the communications links to and from the SVM are operational, then BFD table 1400 indicates, in column 1408, that the status is up. However, if an SVM associated with the VRF1 is nonoperational or if the communications links to and from the SVM are nonoperational, then BFD table 1400 indicates, in column 1408, that the status is down 15. Improvements Provided by Certain Embodiments In an embodiment, an approach allows deploying a plurality of services on a plurality of VRFs, wherein two or more services, of the plurality of services, use the same IP1-IP2 address pair for redirecting packets from edge gateways to service virtual machines. By allowing the deployment of multiple services having the same IP1-IP2 address pair on multiple VRFs, the insertion of the services is not constrained by a limited pool of IP pairs, and does not require that different services have different IP address pairs.

In an embodiment, the approach allows deploying a plurality of services using the same IP1-IP2 address pairs by relying on a global configuration policy table that is indexed using UUIDs derived from a rule table. For each UUID, the global policy table provides a corresponding next_hop address, a VRF identifier, an IP1-IP2 address pair, a hyperlink to a BFD status record, and a hyperlink to a failure configuration file to be used in the event of failure of a service virtual machine.

The approach involves modest modifications to a rule table as the table needs to provide UUIDs of services as actions in place of typical actions such as to allow or to block. The approach also involves modifications to a policy table as that table needs to include UUIDs and VRF identifiers. However, the approach requires no modification to service virtual machines themselves.

16. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

17. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in diverse ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a multi-virtual-routing-and-forwarding ("VRF") and multi-service insertion on edge gateways, the method comprising:
   detecting a packet;
   determining one or more attributes for the packet;
   based on, at least in part, the one or more attributes, determining whether the one or more attributes match one or more rule attributes of a particular rule in a rule table;
   in response to determining that the one or more attributes match the one or more rule attributes of a particular rule in the rule table:
   determining, based on the particular rule, a particular redirection identifier, a particular VRF identifier, a particular next hop, a particular address pair, and a particular BFD status;
   based on, at least in part, the particular BFD status, determining whether to redirect the packet; and
   in response to determining to redirect the packet, resolving a particular MAC address based on, at least in part, the particular next hop, encapsulating the packet with the particular MAC address, and redirecting the packet toward a service virtual machine from an interface indicated by one of addresses in the particular address pair.

2. The method of claim 1, wherein the particular next hop corresponds to an IP address within a network subnet to which an IP local address, identified in the particular address pair, belongs.

3. The method of claim 2, further comprising:
   obtaining a rule configuration;
   based on, at least in part, the rule configuration, creating the rule table comprising one or more rule data records, each rule data record comprising one or more packet attributes and a redirection identifier;
   obtaining a policy configuration comprising one or more policy records, each policy record comprising a redirection identifier, a next hop, and an address pair for interfaces;
   determining a mapping between VRF identifiers and one or more address pairs of interfaces;
   based on, at least in part, the mapping and the policy configuration, generating a policy table comprising one or more table records, each table record comprising a redirection identifier, a next hop, and an address pair for interfaces; and
   redirecting detected packets to service virtual machines based on the rule table and the policy table.

4. The method of claim 1, further comprising:
   generating a bidirectional forwarding ("BFD") data structure comprising BFD records, each BFD record comprising a session identifier, a VRF identifier, an address pair, and a status indicator;
   wherein the status indicator for a particular BFD record is determined by:
   generating and transmitting a BFD test message;
   in response to receiving a BFD response to the BFD test message, assigning an up-indicator to the status indicator; and
   in response to not receiving a BFD response to the BFD test message, assigning a down-indicator to the status indicator.

5. The method of claim 4, further comprising: based on, at least in part, status indicators included in the BFD data structure, adding status indicators to the policy table for corresponding table records.

6. The method of claim 5, wherein the rule configuration is obtained from a management plane, and wherein the rule table includes one or more definitions of rules.

7. The method of claim 6, wherein a policy configuration is obtained from a management plane, and wherein the policy configuration is generated by the management plane based on one or more definitions of network entities and connectivity between the network entities.

8. One or more non-transitory computer-readable storage media storing one or more computer instructions which, when executed by one or more processors, cause the one or more processors to perform:
   detecting a packet; determining one or more attributes for the packet; based on, at least in part, the one or more attributes, determining whether the one or more attributes match one or more rule attributes of a particular rule in a rule table;
   in response to determining that the one or more attributes match the one or more rule attributes of a particular rule in the rule table:
   determining, based on the particular rule, a particular redirection identifier, a particular VRF identifier, a particular next hop, a particular address pair, and a particular BFD status;
   based on, at least in part, the particular BFD status, determining whether to redirect the packet; and
   in response to determining to redirect the packet, resolving a particular MAC address based on, at least in part, the particular next hop, encapsulating the packet with the particular MAC address, and redirecting the packet toward a service virtual machine from an interface indicated by one of addresses in the particular address pair.

9. The one or more non-transitory computer-readable storage media of claim 8, wherein the particular next_hop corresponds to an IP address within a network subnet to which an IP local address, identified in the particular address pair, belongs.

10. The one or more non-transitory computer-readable storage media of claim 9, storing additional instructions which, when executed by the one or more processors, cause the one or more processors to perform:
    obtaining a rule configuration;
    based on, at least in part, the rule configuration, creating the rule table comprising one or more rule data records, each rule data record comprising one or more packet attributes and a redirection identifier;
    obtaining a policy configuration comprising one or more policy records, each policy record comprising a redirection identifier, a next hop, and an address pair for interfaces;
    determining a mapping between VRF identifiers and one or more address pairs of interfaces;
    based on, at least in part, the mapping and the policy configuration, generating a policy table comprising one or more table records, each table record comprising a redirection identifier, a next hop, and an address pair for interfaces; and
    redirecting detected packets to service virtual machines based on the rule table and the policy table.

11. The one or more non-transitory computer-readable storage media of claim 10, storing additional instructions for:

generating a bidirectional forwarding ("BFD") data structure comprising BFD records, each BFD record comprising a session identifier, a VRF identifier, an address pair, and a status indicator;

wherein the status indicator for a particular BFD record is determined by:

generating and transmitting a BFD test message; in response to receiving a BFD response to the BFD test message, assigning an up-indicator to the status indicator; and in response to not receiving a BFD response to the BFD test message, assigning a down-indicator to the status indicator.

12. The one or more non-transitory computer-readable storage media of claim 11, storing additional instructions for: based on, at least in part, status indicators included in the BFD data structure, adding status indicators to the policy table for corresponding table records.

13. The one or more non-transitory computer-readable storage media of claim 12, wherein the rule configuration is obtained from a management plane, and wherein the rule table includes one or more definitions of rules.

14. The one or more non-transitory computer-readable storage media of claim 13, wherein a policy configuration is obtained from a management plane, and wherein the policy configuration is generated by the management plane based on one or more definitions of network entities and connectivity between the network entities.

15. A packet redirector implemented in an edge gateway computer and configured to provide a multi-virtual-routing-and-forwarding ("VRF") and multi-service insertion on edge gateways, the packet redirector comprising:

one or more processors; one or more memory units; and
one or more non-transitory computer-readable storage media storing one or more computer instructions which, when executed by the one or more processors, cause the one or more processors to perform:
detecting a packet;
determining one or more attributes for the packet;
based on, at least in part, the one or more attributes, determining whether the one or more attributes match one or more rule attributes of a particular rule in a rule table;
in response to determining that the one or more attributes match the one or more rule attributes of a particular rule in the rule table: determining, based on the particular rule, a particular redirection identifier, a particular VRF identifier, a particular next hop, a particular address pair, and a particular BFD status;
based on, at least in part, the particular BFD status, determining whether to redirect the packet; and in response to determining to redirect the packet, resolving a particular MAC address based on, at least in part, the particular next hop, encapsulating the packet with the particular MAC address, and redirecting the packet toward a service virtual machine from an interface indicated by one of addresses in the particular address pair.

16. The packet redirector of claim 15, wherein the particular next hop corresponds to an IP address within a network subnet to which an IP local address, identified in the particular address pair, belongs.

17. The packet redirector of claim 16, storing additional instructions which, when executed by the one or more processes, cause the one or more processors to perform:

obtaining a rule configuration;
based on, at least in part, the rule configuration, creating the rule table comprising one or more rule data records, each rule data record comprising one or more packet attributes and a redirection identifier;
obtaining a policy configuration comprising one or more policy records, each policy record comprising a redirection identifier, a next hop, and an address pair for interfaces;
determining a mapping between VRF identifiers and one or more address pairs of interfaces;
based on, at least in part, the mapping and the policy configuration, generating a policy table comprising one or more table records, each table record comprising a redirection identifier, a next hop, and an address pair for interfaces; and redirecting detected packets to service virtual machines based on the rule table and the policy table.

18. The packet redirector of claim 17, storing additional instructions for:

generating a bidirectional forwarding ("BFD") data structure comprising BFD records, each BFD record comprising a session identifier, a VRF identifier, an address pair, and a status indicator;
wherein the status indicator for a particular BFD record is determined by:
generating and transmitting a BFD test message;
in response to receiving a BFD response to the BFD test message, assigning an up-indicator to the status indicator; and
in response to not receiving a BFD response to the BFD test message, assigning a down-indicator to the status indicator.

19. The packet redirector of claim 18, storing additional instructions for: based on, at least in part, status indicators included in the BFD data structure, adding status indicators to the policy table for corresponding table records.

20. The packet redirector of claim 19, wherein wherein the address pair comprises a first IP address and a second IP address, and wherein the first IP address is different that the second IP address.

* * * * *